Feb. 19, 1935.   W. G. CALKINS ET AL   1,991,491
SPRING SHACKLE BEARING
Filed Sept. 18, 1930   2 Sheets-Sheet 2

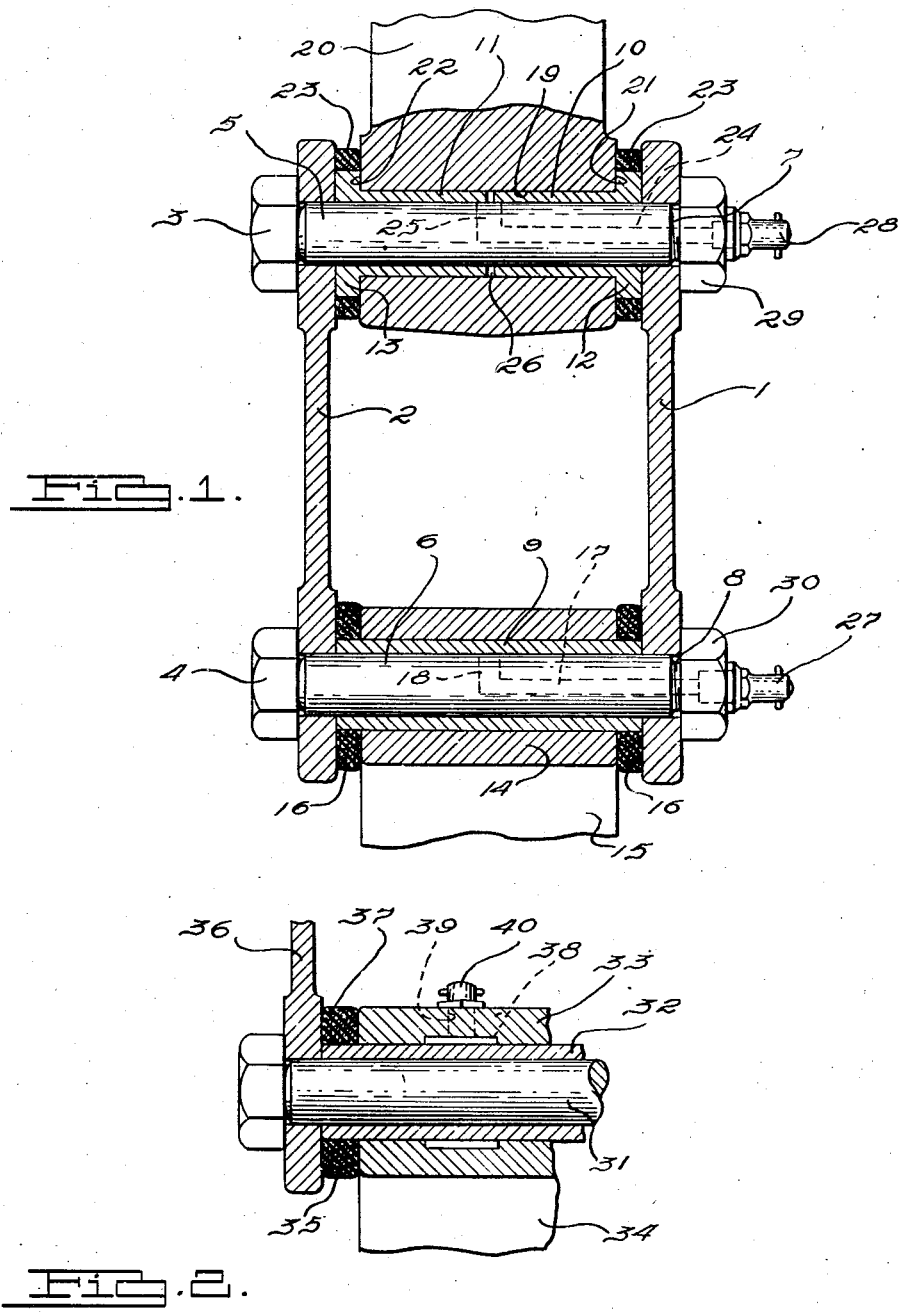

INVENTORS
WILLIAM G. CALKINS AND
ANTHONY J. LANGHAMMER.
BY
ATTORNEY

Patented Feb. 19, 1935

1,991,491

UNITED STATES PATENT OFFICE

1,991,491

SPRING SHACKLE BEARING

William G. Calkins and Anthony J. Langhammer, Detroit, Mich., assignors to Chrysler Corporation, Detroit, Mich., a corporation of Delaware Application September 18, 1930, Serial No. 482,808

1 Claim. (Cl. 308—120)

The main objects of the invention are to provide an improved spring shackle; to provide improved bearings in spring shackles which have substantial lubricant containing capacities; to provide porous bearings of this kind in which the lubricant is stored in the body of the bearings; to provide porous bearing sleeves in a spring mounting which abut the inner side surfaces of the respectively opposite shackle bars and prevent sidewise movement of a spring relative to the bracket or support upon which the spring shackle is mounted; to provide a cylindrical sleeve of this kind which permits lubricant to permeate through the body thereof throughout its entire length so as to supply the whole inner peripheral bearing surface and the surfaces of the extremities of the sleeve with lubricant; to provide means for sealing the end portions of the bearing sleeve against leakage of lubricant and against admission of dirt and other foreign matter; and to provide a lubricant reservoir in a bearing sleeve from which lubricant will permeate through the body of the sleeve to all the anti-friction surfaces thereof.

An illustrative embodiment of our invention is shown in the accompanying drawings, in which:

Fig. 1 is a longitudinal central section of a spring shackle which embodies our invention.

Fig. 2 is a fragmentary longitudinal section of a spring shackle showing a modified form of the invention.

Figure 3:
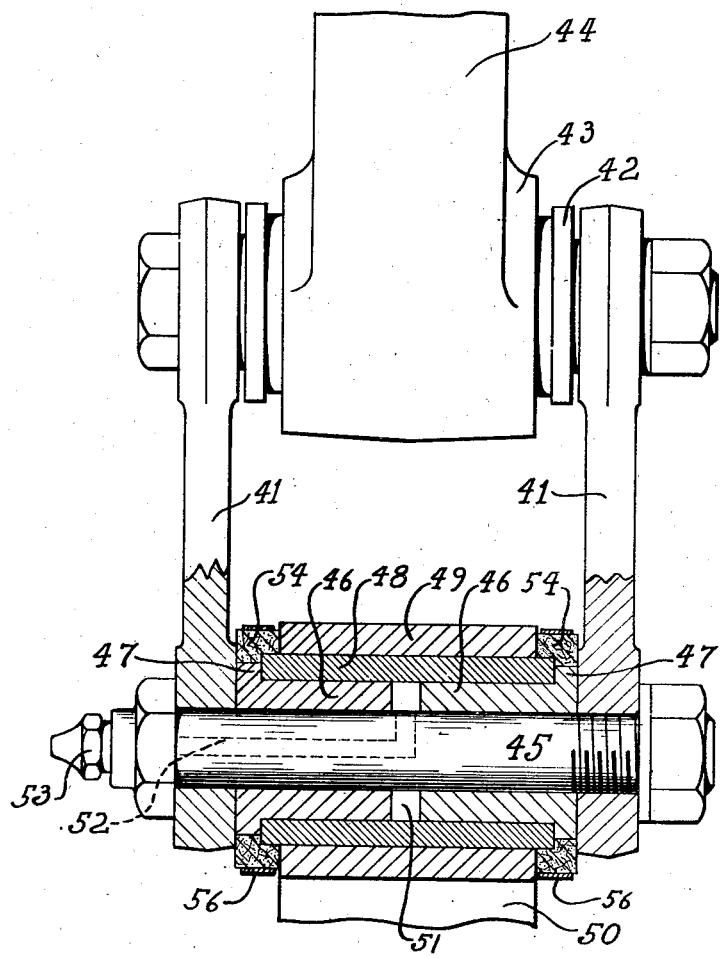
Fig. 3 is a side elevation, partly in section of a shackle embodying another form of our invention.

In the form shown in Fig. 1, the shackles includes a pair of spaced shackle bars 1 and 2 having registering apertures in their respectively opposite extremities. Extending through the registering apertures of the upper and lower extremities of the shackle bars are bolts 3 and 4 which have machined, cylindrical intermediate portions 5 and 6 and threaded end portions 7 and 8, respectively. The cylindrical intermediate portion 6 of the lower bolt 4 is journaled in a cylindrical sleeve or bearing 9 which comprises porous metal impregnated with mobile lubricant. The extremities of the bearing sleeve 9 are machined and they abut the inner side faces of the shackle bars 1 and 2. The upper shackle bolt 3 is provided with a bearing which includes a pair of sleeve sections 10 and 11 which have radial flanges 12 and 13 on their outer ends respectively, having machined ends which bear against the inner side faces of the shackle bars 1 and 2.

A suitable porous structure for bearings of this kind may be formed by sintering a mixture of substantially 85 parts of powdered copper, 13 parts of powdered tin, about 2 parts of graphite and a small amount of stearic acid, or other solid of liquid lubricant at a temperature of substantially 1500° Fahrenheit. This temperature is considerably above the melting point of tin and safely below the melting point of copper. The lubricant permits the mixture to be compressed into a mold or suitable form preparatory to the sintering treatment during which the mixture is converted to a rigid form which is capable of being machined. Various other porous metal compositions may be used in place of the above example which is recited merely as an illustration of a workable composition.

The bearing sleeve 9 on the lower shackle bolt 4 is received in an eye 14 of a leaf spring 15. The eye 14 preferably grips the bearing sleeve 9 with sufficient force to prevent relative movement between the eye and the sleeve. In some cases it may be found desirable to serrate the inner peripheries of the eye 14 longitudinally so as to increase the resistance to relative rotation between the sleeve 9 and the eye 14.

The width of the eye 14 is substantially less than the distance between the shackle bars 1 and 2 and the eye is located centrally on the bearing sleeve 9 providing spaces between the extremities of the eye and the adjacent side faces of the shackle bars 1 and 2. Located in each of these spaces is a compressible washer 16, preferably comprising yieldable rubber which is compressed against the adjacent side surfaces of the shackle bars and the eyes, thus forming a liquid tight seal which prevents lubricant from escaping from the end portions of the bearing sleeve 9 and also seals the end portions of the bearing sleeve against the admission of dirt and other foreign matter. A central axially extending lubricant passage 17 formed in the lower shackle bolt 4 having a radially extending outlet passage 18 which is opened at the outer periphery of the bolt 4 forms a convenient means by which lubricant may be introduced into the bearing.

The bearing sleeve sections 10 and 11 of the upper shackle bolt 3 extend into a cylindrical passage 19 formed in a bracket 20 of the type generally used in supporting spring shackles or other spring suspensions on a vehicle chassis. The adjacent sides of the radial flanges 12 and 13 of the bearing sleeve sections 10 and 11 bear against the right and left extremities 21 and 22 of the bracket 20, respectively and the outer sides of the flanges 12 and 13, which are machined smooth, bear against the inner sides of the shackle bars 1 and 2, respectively. These flanges hold the upper ends of the shackle bars in spaced relation to the extremities of the bracket 20 providing spaces in which washers 23, preferably comprising felt or rubber are located. These washers prevent the leakage of lubricant from the end portions of the bearing sleeve sections 10 and 11 and also prevent the admission of dirt and other foreign matter to the bearing surfaces.

The shackle bolt 3 has a central, axially extending lubricant passage 24 which has an outlet 25 located substantially at the middle of the cylindrical part 5 of the bolt and communicating with a gap 26 between the inner ends of the bearing sleeve sections 10 and 11. The gap 26 forms a reservoir in which a substantial supply of lubricant is accommodated. The inlet ends of the lubricant passage 17 and 24 are provided with self-closing lubricant fittings 27 and 28, respectively. Threaded on the right ends of the shackle bolts 3 and 4 are nuts 29 and 30, respectively which firmly clamp the parts of the shackle together and hold the rubber washers 16 and 23 under compression.

In operation, lubricant is forced through the passages 17 and 18 of the lower shackle bolt 4 and through the passages 24 and 25 of the upper shackle bolt 3 under pressure. The lubricant penetrates into the body of the bearing sleeve 9, and the bearing sleeve sections 10 and 11 and permeates through the entire length of the porus material of which these bearing members are formed. A substantial quantity of lubricant is stored in this manner in the body of the bearing members and is at all times available at the inner peripheries of the bearing sleeves for the purpose of lubricating the engaging surfaces of the shackle bolts and bearings. Some of the lubricant travels to the ends of the bearing sleeves lubricating the side surfaces of the shackle bars 1 and 2 with which the extremities of the sleeve contact.

Both oscillating joints of the shackle may be provided with spaced bearing sleeve sections 10 and 11 or with integral cylindrical sleeves 9, if desired.

In the fragmentary view shown in Fig. 2, a portion of one oscillating joint of a spring shackle which embodies a further development of our invention is illustrated. This shackle includes a shackle bolt 31 which is journaled in a cylindrical bearing sleeve 32 that is formed of porous material of the type described in connection with Fig. 1. This sleeve is firmly clamped in an eye 33 of a spring 34 and it extends beyond the respectively opposite ends of the eye as illustrated at 35. The extremities of the sleeve 32 each bear against the inner surface of one of a pair of shackle bars 36 which is supported on the outer end portions of the shackle bolt. Located between each extremity of the eye 33 and the adjacent side of the shackle bar 36 is a yieldable washer 37, preferably comprising yieldable material such as felt, which is firmly compressed so as to prevent dirt, water and other foreign material from entering the bearing and to prevent the lubricant therein from escaping.

Formed in the inner periphery of the eye 33 is an annular recess or channel 38 with which a radial passage 39 communicates. The outer end of the passage 39 is provided with a self-closing lubricant fitting 40 through which lubricant under pressure may be introduced into the annular channel 38. This channel provides a reservoir from which lubricant permeates through the body of the bearing sleeve 32 to the inner periphery of the sleeve and to the respectively opposite extremities thereof.

The shackle shown in Fig. 3 has an oscillating joint which includes porous bearings and which is particularly adapted for use in an open eye of a spring. This shackle has spaced shackle bars 41 which are supported by an oscillating joint 42 that is received in the closed eye 43 of a spring mounting bracket 44. The oscillating joint 42 may be of any of the forms shown in Figs. 1 and 2 or it may be formed in accordance with the construction shown in section in Fig. 3.

The lower ends of the shackle bars 41, shown in Fig. 3, are connected together by a bolt 45 on which spaced sleeves 46 are journaled. These sleeves comprise porous material of the type described in connection with Figs. 1 and 2 and they are provided with radial end flanges 47 which bear against the inner side surfaces of the shackle bars. The porous bearing sleeves are fitted in a non-porous metal sleeve or tube 48 which is received in the open eye 49 of a spring 50 and which forms a seal around the space 51 provided between the inner ends of the sleeves 46. The space 51 serves as a reservoir for retaining a supply of lubricant which may be introduced into the space through the passage 52 and through the lubricating fitting 53 on the outer end of the bolt 45. Washers 54 preferably comprising compressible material such as felt or rubber are seated upon the outer periphery of the flanges 47 of the sleeve 46. These washers are clamped between the side faces of the shackle bars 41 and the extremities of the tube 48 and eye 49 of the spring and they are held under compression by a metal ring 56.

With this form of the invention, the oscillating joint of the shackle is sealed against leakage even though the loop of the spring in which the joint is received is open.

Although but several specific embodiments of this invention have herein been shown and described, it will be understood that various changes in the size, shape and arrangement of parts may be made without departing from the spirit of our invention and it is not our intention to limit its scope other than by the terms of the appended claim.

What we claim is:

In a mounting of the character described, a bolt, a shackle bar mounting said bolt adjacent each end thereof, porous metal sleeve bearing means receiving said bolt in contact therewith, said sleeve means extending longitudinally of said bolt, a member mounted by said bolt, said member having a cylindrical opening receiving said sleeve means and contacting therewith, said sleeve means and said member being fitted to prevent their relative movement, said sleeve means and said bolt having contacting surfaces for relative oscillatory movement, means including a passage through said bolt for supplying lubricant inwardly of said bolt and outwardly thereof intermediate said bars to a distributing zone exposed to the contacting surfaces of said sleeve means and bolt, said contacting surfaces of said sleeve means and bolt substantially preventing flow of lubricant from said distributing zone along and between said surfaces longitudinally of said bolt, the porosity of said sleeve means being adapted to restrictedly feed the lubricant longitudinally thereof in opposite directions from said distributing zone to lubricate the contacting surfaces of said sleeve means and bolt, said sleeve means having end radially flanged portions thereof respectively contacting with said shackle bars and with said bolt mounting member, and packing means surrounding each of said radially flanged portions intermediate said bolt mounting member and said shackle bars.

WILLIAM G. CALKINS.
ANTHONY J. LANGHAMMER.